Patented Feb. 9, 1932

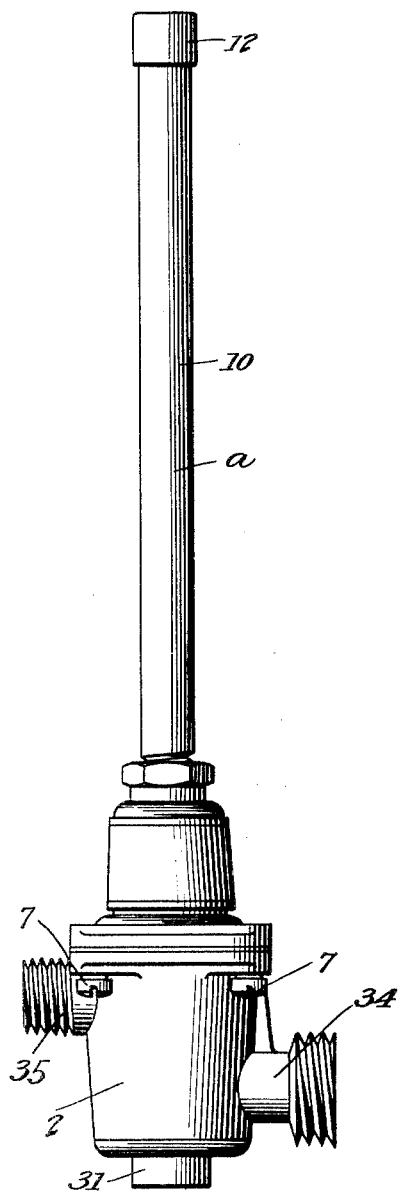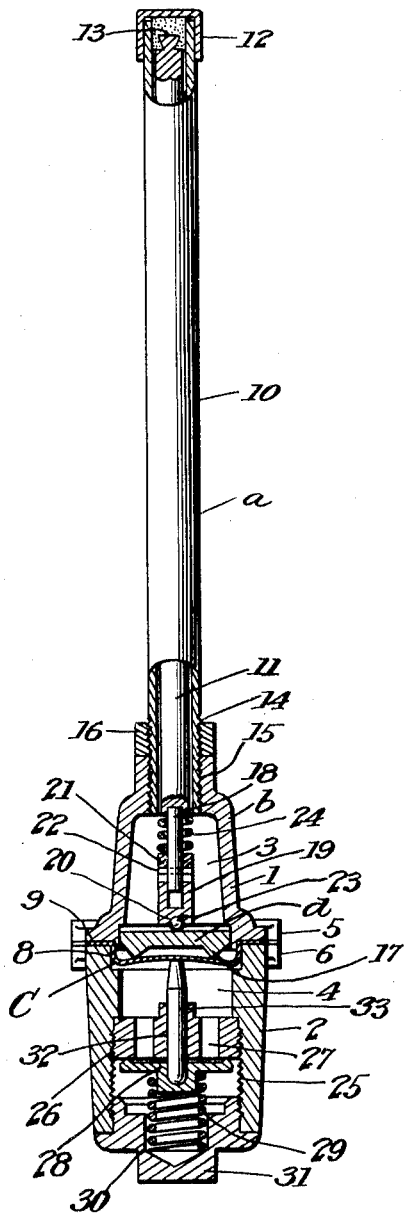

1,844,321

UNITED STATES PATENT OFFICE

OSCAR J. KAY, OF LOS ANGELES, CALIFORNIA, ASSIGNOR TO GENERAL WATER HEATER CORPORATION, OF LOS ANGELES, CALIFORNIA, A CORPORATION OF DELAWARE

THERMOSTATIC TEMPERATURE CONTROL

Application filed August 23, 1929. Serial No. 387,901.

This invention relates to thermostatic controls for hot water heaters, and has for an object the provision of a control so arranged and constructed as to permit ready adjustment of the control in accordance with temperature conditions.

Thermostatic controls are often sold separately from heaters, or heaters are shipped to different parts of the world, with the result that a thermostatic control which has been adjusted at the point of shipment will not always function properly at some other location, due to temperature difference. It is, of course, realized that the thermostatic control can be adjusted at each point, but this is not always easy of accomplishment by plumbers who are not entirely familiar with the control or the heater. It is with the idea of overcoming certain of these disadvantages that the present invention is primarily directed. Where a thermostatic control utilizes what is known as a snap action disc such as, for instance, illustrated in the patent to William A. Merrick, No. 1,542,712, granted June 16, 1925, it is necessary that this snap action disc should have movement past its center within 15° or 20° temperature difference, and to accomplish this, the thermostat for such a control is usually set at approximately 150°. However, if the thermostat was set for one temperature in a given locality and the thermostat control and heater were shipped to a very cold climate, it is evident that considerable strain would be imposed upon the snapping disc. This is not desirable and to overcome this, certain prior investigators have attempted to utilize some form of lost motion device.

The present invention has for an object the provision of means adapted to be readily regulated, to the end that a snapping disc does not have undue strain imposed thereon by reason of undue contraction of the thermostat element.

A further object is the provision of a thermostatic control adapted to operate at its original set temperature difference and regardless of climatic conditions.

Another object is the provision of a thermostatic control so arrranged and constructed as to be easy of adjustment, economical in cost of manufacture, and generally superior.

With the above mentioned and other objects in view, the invention consists in the novel and useful provision, formation, construction, association and relative arrangement of parts, members and features, all as shown in a certain embodiment in the accompanying drawings, described generally and more particularly pointed out in the claims.

In the drawings:

Figure 1 is an elevation of the control shown in Figure 2, and,

Figure 2 is an elevation, partly in section, of the control shown in Figure 1.

Referring to the drawings, the improved device includes a thermostatic element $a$ which is adjustably secured to a housing $b$. This housing is in two parts, as shown at 1 and 2, the said parts being in the form of chambered members, as shown at 3 and 4. The two members are flanged at 5 and 6 and held together in any approved manner, such as by the means 7. Adapted to be interposed between the two members of the housing and held in position at the flanged zone is a diaphragm $c$. This diaphragm is of the cupped type, and viewing Figure 2, it will be seen that it is of the convex-concave type with its marginal edges curved upwardly, as shown at 8, and then straight outwardly, as shown at 9. The straight or annular portion 9 is the part that is held between the two members of the housing. The thermostat $a$ includes an expansion tube 10 and a push rod 11. The thermostat tube is closed at its upper end 12 and the push rod is likewise secured in any suitable manner, as illustrated at 13, within the tube and adjacent the cap. This thermostat tube, as before stated, is adjustably secured to the housing by screw-threading the same externally as shown at 14 and likewise providing internal screw-threads 15 associated with the housing. In this connection, a nut 16 is likewise carried on the screw-threads of the thermostat tube. Adapted to contact with the diaphragm is a bridge member $d$. This bridge member includes an annular wedge-shaped flange 17, the sharp edges of the wedge being the part that engages the diaphragm and on the convex side thereof. It will be further noted that the center of the convex side of the diaphragm is not contacted with by the bridge piece. The push rod carries a relatively movable member, preferably in the form of a head 19. In order to support this part, I provide a short length stem 18, which stem is adapted for slide movement within member 19. The head 19 is provided with a base portion 20. Furthermore, the tubular member is transversely slotted at 21 and a pin 22 is received within said slot and passed through the stem 18. Between the base 20 of the member 19 and the top surface of the bridge member $d$ is a bearer preferably in the form of a ball 23. Surrounding the stem 18 and between the tubular member 19 and the end of the push rod is a coil spring 24. The part 2 of the housing is provided with internal screw-threads 25, and screw-threaded to the said threads 25 is a valve cage 26. This valve cage is provided with one or more transverse openings 27. A valve disc 28 is adapted for contact with said valve cage so as to open or close passage through the transverse bores 27. This valve disc is held in normal seated position through the medium of a coil spring 29, which coil spring in turn is seated within a bore or recess 30 in a plug 31. This plug is screw-threaded to the threads 25. The valve cage is formed with a central bore 32 and carried by the valve disc and passed through said central bore is a pin 33. This pin terminates immediately below the diaphragm $c$ and centrally of said diaphragm.

Entrance for gas or other combustible fluid is permitted within the part 2 of the housing and below the valve disc 28 by a connection 34 and exit from the part 2 of the housing and above the valve cage through the member or connection 35.

The operation, uses and advantages of the invention just described are as follows:

It is assumed that the thermostatic element is within the heater where the water may contact with the thermostat tube 10. When this tube expands, the push rod will move upwardly therewith and relieve pressure from the bridge so that the valve disc 28 will close and the parts will assume the relation substantially as shown in Figure 2. However, if the thermostat tube should contract, the push rod will be carried downwardly and pressure will be exerted through the spring 24 against the member 19 to push the bridge piece downwardly and this downward movement will likewise tend to cause the diaphragm to snap past center position and from the position shown in Figure 2, to the end that the pin 33 is moved downwardly to open the valve disc against the pressure of the spring 29 and allow gas or other combustible fluid to pass through the member 34 and through the transverse openings 27 of the valve cage and outwardly through the member 35.

As pointed out in the preamble, the diaphragm must function properly in order that the thermostat should perform efficiently. It is quite evident that if the push rod directly contacted with the bridge piece, that undue contraction of the push rod due to extremely low temperature, might permanently damage the diaphragm. With the present invention, it is possible to adjust the thermostat in accordance with climatic conditions. If a thermostatic element of the type depicted were shipped from a very cold climate to a very warm climate, quite obviously the setting for the warm climate would not be correct for the cold climate and as a consequence, the thermostat would be shipped so that the diaphragm would not be in any wise injured, by merely adjusting the thermostatic tube 10 relative to the housing $b$. When the plumber desires to adjust this thermostat, he should take into consideration the climatic conditions under which the thermostat must operate and turn the thermostatic tube so that the pin 22 will be so positioned as to contact with the upper end of the slot in the member 19. The spring 24 at all times exerts a pressure against the member 19. It is evident that no lost motion occurs in the regular operation of the device but that the bridge piece is at all times pressed against the diaphragm through the medium of the spring, and that this spring acts as a relief device if the thermostat element contracts unduly, to prevent the diaphragm from being subjected to any greater pressure than can be imparted through the spring 24.

I claim:

1. In a thermostatic control, the combination of a diaphragm, a thermostatic element constituting an expansion and contraction member and a push rod therein, said push rod having an extention, a bridge member in contact with said diaphragm, a tubular member in engagement with said bridge member, said push rod extension being slidable within said tubular member, and resilient means between the push rod and said tubular member for urging the tubular member toward the diaphragm.

2. In a thermostatic control, the combination of a diaphragm, a thermostatic element constituting an expansion and contraction member and a push rod therein, said push rod having an extension, a bridge member in contact with said diaphragm, a tubular member in engagement with said bridge member, said push rod extension being slidable within said tubular member, and resilient means between the push rod and said tubular member for imparting the contracting movement of the thermostat element to the tubular member and means for limiting movement of the tubular member relative to the push rod.

3. In a thermostatic control for a gas valve, the combination of a casing, a snap diaphragm mounted in said casing, a gas valve in the casing mounted so as to close by a movement toward the diaphragm, a valve spring associated with the valve and urging the same to close, a stem connected with the valve, guided in the casing and having its end engaging the snap diaphragm so that the snap diaphragm may prevent the valve from closing, a thermostat element mounted in the casing adjacent the face of the diaphragm opposite to the valve, a push-rod connected with the thermostat element, a member carried on the push-rod adjacent the diaphragm for limiting the movement of the diaphragm, means for permitting a limited movement of said member with relation to the push-rod and toward or from the diaphragm, and a spring associated with said member and said push-rod for holding said member in its extreme position toward the diaphragm, said parts cooperating so that expansion of the thermostat element may permit the valve spring to close the valve, the second named spring operating to limit the pressure of the said member against the diaphragm if the thermostat element contracts unduly.

4. In a thermostatic control for a gas valve, the combination of a casing, a snap diaphragm mounted in said casing, a gas valve in the casing mounted so as to close by a movement toward the diaphragm, a valve spring associated with the valve and urging the same to close, a stem connected with the valve and engaging the face of the diaphragm substantially at its center, guided in the casing and having its end engaging the snap diaphragm so that the snap diaphragm may prevent the valve from closing, a thermostat element mounted in the casing adjacent the face of the diaphragm opposite to the valve, a push-rod connected with the thermostat element, a member carried on the push-rod adjacent the diaphragm for limiting the movement of the diaphragm, means for permitting a limited movement of said member with relation to the push-rod and toward or from the diaphragm, a spring associated with said member and said push-rod for holding said member in its extreme position toward the diaphragm, and a rigid bridge member between said member and the diaphragm and having an annular flange with its edge resting against the diaphragm, said parts cooperating so that expansion of the thermostat element may permit the valve spring to close the valve, the second named spring operating to limit the pressure of the said member against the diaphragm if the thermostat element contracts unduly.

In testimony whereof, I have signed my name to this specification at Los Angeles, California, this 18th day of July, 1929.

OSCAR J. KAY.